Feb. 4, 1936.　　　　D. B. KNIGHT　　　　2,029,428
AIR CONDITIONING METHOD AND APPARATUS
Filed Aug. 17, 1932　　　2 Sheets-Sheet 1
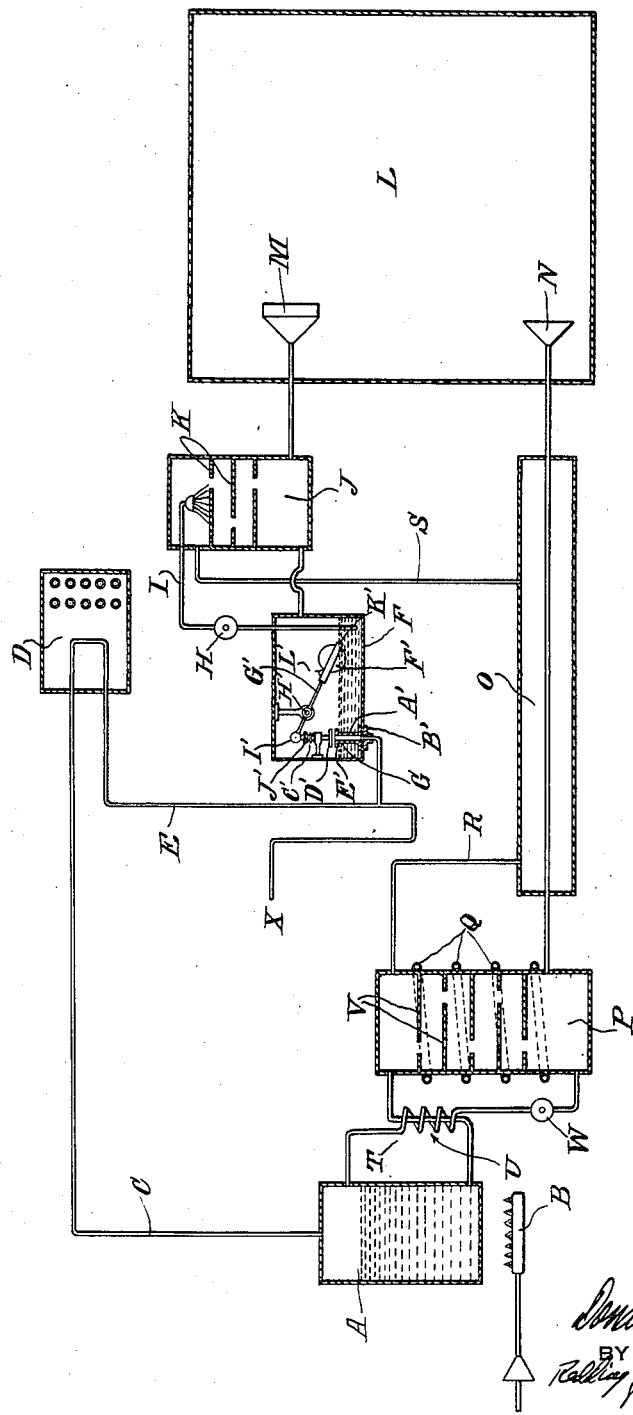

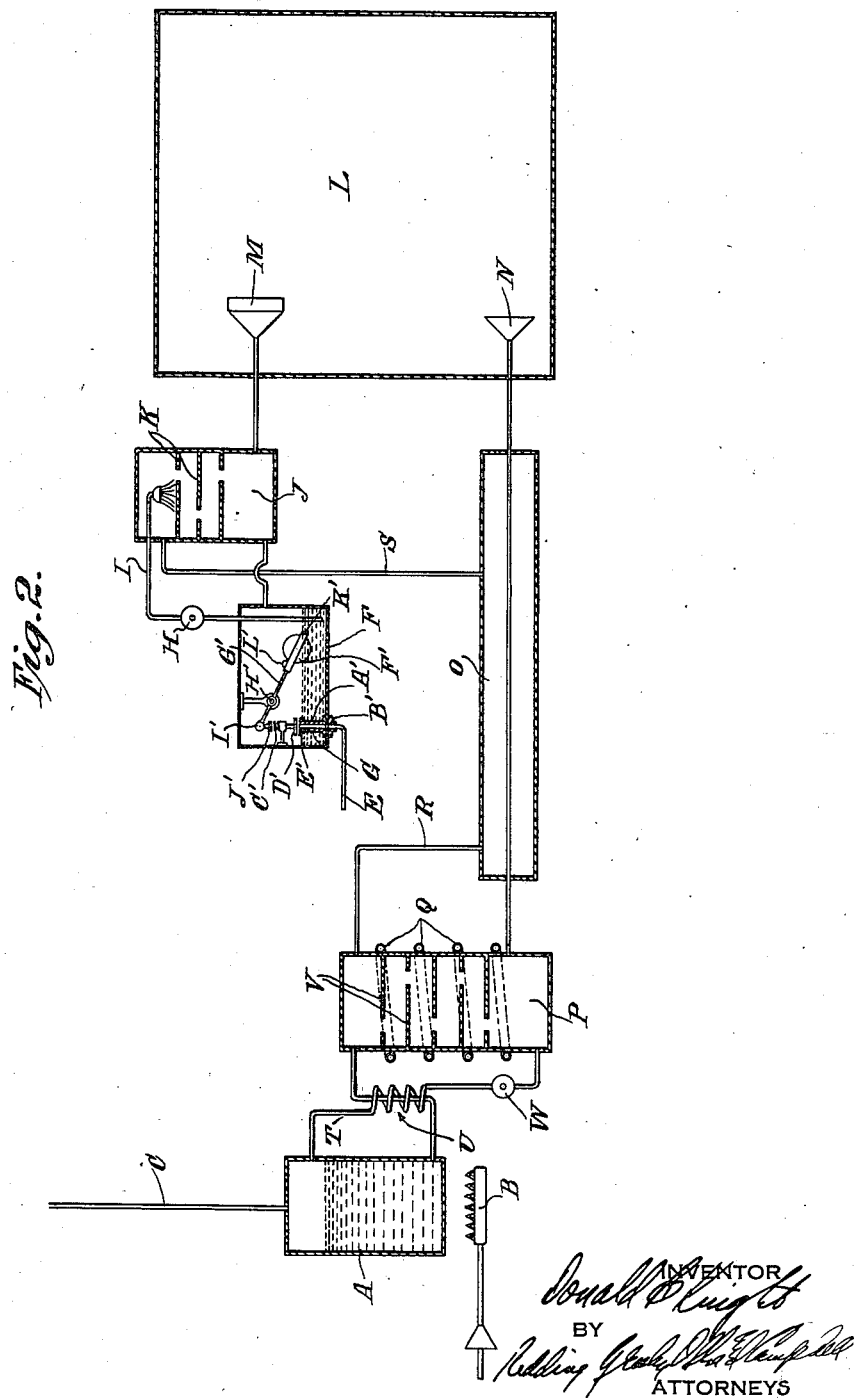

Patented Feb. 4, 1936

2,029,428

UNITED STATES PATENT OFFICE 2,029,428

AIR CONDITIONING METHOD AND APPARATUS

Donald B. Knight, Brooklyn, N. Y., assignor to Refrigeration Research Corporation, Brooklyn, N. Y., a corporation of New York Application August 17, 1932, Serial No. 629,133

8 Claims. (Cl. 62—176)

This invention relates to air conditioning systems, particularly to those systems whereby the air is cooled in the summer time for the comfort of people in houses or auditoriums, by the process of evaporating water into previously dehumidified air.

It is a characteristic of such processes as at present conducted that the air leaving the evaporator is saturated or nearly saturated with water vapor. In order, therefore, that the relative humidity in the enclosures to be cooled may not run too high, the temperature of the air in the evaporator must be brought much lower than the temperature which it is desired to maintain within the enclosures, assuring in this way a low pressure of water vapor in the air. Furthermore, since the amount of air to be circulated successively through the evaporator and the enclosure is prescribed, and since it is undesirable to permit the air to enter the enclosure at a temperature more than 8 or 10 degrees F. below the room temperature, the air leaving the evaporator must be heated by some means in order to arrive at the required relative humidity and air temperature.

Methods are already known by which the air may be heated without much increase in the amount of refrigeration required due to the addition of such heat. The air ducts entering the evaporator can be arranged in heat exchange relation to accomplish the result, or the air leaving the evaporator may be mixed with a quantity of air from the cooled enclosure in prescribed proportions so that the resulting mixture may be delivered to the enclosure under the desired conditions. However, there are objections to the application of these methods in that when a heat exchanger is employed there is always a material loss in refrigeration and, in the second method, where the air is mixed, a much greater quantity of air must be circulated than is necessary unless mechanical controls are introduced. In the carrying out of the refrigeration process to which the present invention pertains, the circulation of air is greatly in excess of the circulation required by ordinance and of the circulation which is usual in other systems where no reheating of the air is contemplated and where therefore the air is delivered at an uncomfortably low temperature. The mixing method increases this excess when the system is running at less than maximum load, unless the quantity of air passing from the cooled enclosure to the mixing chamber is throttled in some way and is therefore objectionable in its requirement of a larger number of ducts and blowers.

It is the object of the present invention to remove entirely the necessity of re-heating the air in its passage from the evaporator to the cooled enclosure and thereby to eliminate the disadvantages of the methods discussed.

A further advantage results in that a lower dew point of the air delivered to the enclosure is obtained than is possible by the process referred to of permitting the dried air to reach its wet bulb temperature and subsequently reheating it.

Figure 1 is a diagrammatic illustration of a system constructed in accordance with the present invention.

Figure 2 is a diagrammatic illustration similar to Figure 1, showing an air conditioning system embodying the present invention and of the type commonly termed an open system.

This system constitutes an absorption refrigerating system using an inert gas in which as heretofore the control of the temperature of the inert gas leaving the evaporator is effected by controlling the heat applied to the generator, and in which the absorption solution is weakened by an increase in the heat applied, which results in a change in the percentage of refrigerant carried in the inert gas passing to the evaporator. The inert gas employed is air, which is circulated through the evaporator, the enclosure to be cooled, the absorber, and back to the evaporator in succession. In such systems a predetermined and optional dew point is maintained in the air passing to the evaporator. The absorption solution is preferably a solution of some non-volatile compound in water, such as calcium chloride brine, which is circulated through the absorber and the generator, the water being driven off in the generator, condensed and passed to the evaporator, where it is evaporated by diffusion into the circulated air.

The improvement in the system which is contemplated by this invention is the interposition of a reservoir containing a quantity of absorption solution, rich in water, between the condenser and the evaporator. This solution is circulated by a pump between the reservoir and the evaporator, and is continuously deprived of some of its water content in the evaporator, while being enriched in water content by the supply draining from the condenser in its passage through the reservoir. Evaporation is thereby arranged to take place from a brine instead of from pure water, the advantages of which will be discussed later.

Referring to Figure 1, the operation is as follows:

In the generator A water is boiled away from the calcium chloride solution by the heat supplied from the gas burner B. The steam passes upward through the lead C to the condenser D where it is condensed to a liquid by contact with cooling water coils or the like. From the condenser the water is drained through the lead E to the reservoir F, passing through the float valve G. Within the reservoir F the water mixes with a solution of calcium chloride and water or some other suitable brine, and the resulting mixture is pumped by the pump H through the lead I to the evaporator J, where it is permitted to cascade downwardly over the baffles or discs K. The discs K spread the solution so that an extended surface is offered by the solution to the air which is present in the evaporator. This air has been previously dried in a manner that will be described later. Evaporation of the water into the air consequently takes place with a reduction in the evaporator temperature and, due to its contact with the cold brine, a consequent reduction in the temperature of the air within the evaporator.

The cooled air is passed to the enclosure L to be cooled through the agency of the fan M. Within the enclosure L the air mixes with the warmer air present and receives the heat load. It is then forced also through the angency of the fan M, from the enclosure, through the port N, and the inner duct of the gas heat exchanger O, to the bottom of the absorber P, through which it passes upwardly and within which the water vapor which the air has taken on in its passage through the evaporator, is absorbed. The heat of absorption is taken up and dissipated by means of the cooling water coils Q or their equivalent. The air leaves the absorber through the duct R, the outer duct of the gas heat exchanger O, and returns to the evaporator J, through the lead S in a dried condition. Obviously the air system need not necessarily be a recirculating one as described above, and if so desired air from without the enclosure may be delivered to the absorber, and the air delivered to the enclosure may be permitted to escape.

The calcium chloride solution in the generator which has been weakened with respect to its water content drains to the absorber P through the lead T in the liquid heat exchanger U and cascades downwardly over the absorber discs V in the same manner as the solution operates in the evaporator. From the bottom of the absorber, the solution which is now rich in water content is pumped back to the generator through the liquid heat exchanger U by the pump W, thereby completing the cycle of the water through the system.

Inasmuch as the solution of calcium chloride and water which is circulated between the evaporator J and the reservoir F has a somewhat lower vapor pressure than the vapor pressure of water, the air, although cooled to 8 or 10 degrees below the temperature of the enclosure to be cooled, is not saturated with water vapor. In other words the air leaving the evaporator has a satisfactory dew point for delivery to the enclosure as well as a satisfactory temperature, even though it has been brought to complete equilibrium with the fluid contained in the evaporator. Consequently it is unnecessary to cool the air below the required temperature and reheat it as described where pure water instead of the solution is used. A similar result may be accomplished with the use of pure water instead of a solution by reducing the evaporating surfaces in the evaporator.

Such a recourse brings about incomplete saturation of the air with water vapor. The air is not therefore cooled to so low a temperature and since it likewise contains less water vapor than it would if equilibrium were reached no reheating is necessary. It will be seen, however, that if the rate of air circulation is lowered when less refrigeration within the enclosure is demanded, saturation or equilibrium conditions are approached in the evaporator and the air may no longer be delivered to the rooms under desirable conditions.

The use of a solution brings about flexibility in answer to varying refrigerating demands without recourse to reheating of any sort.

In reaching this desired end certain requirements must be met. It is essential that the air that is delivered to the enclosure be pure and conditioned air. Any process, therefore, which contemplates using a fluid other than pure water in the evaporator must provide for the exclusion of the gaseous products of the foreign fluid which may be carried with air to the enclosure. In this invention such impurities are excluded from the enclosure by retaining the solute in the liquid state substantially in its entirety during evaporation.

A further problem which must be met is that the system should be flexible and permit of a change in the dew point of the air when the evaporator temperature is changed. Where simply condensed water is permitted to flow to the evaporator instead of the solution, a high degree of flexibility is realized for the dew point as well as the evaporator temperature of the conditioned air may be lowered by weakening the absorption solution. Such weakening is simply effected by increasing the heat applied to the generator and storing more water in the evaporator.

It will be seen, however, that where the solution is employed, the weakening of the absorption liquor by storing water in the evaporator enriches the solution in the evaporator so that the vapor pressure of this solution rises correspondingly as the vapor pressure of the absorber solution is lowered. The effect of this upon the dew point of the conditioned air is that it remains more or less at the same point, for the change in the vapor pressure of the evaporator solution has a tendency to cancel the effect of the change in the vapor pressure of the absorption solution.

In other words, the temperature of the air cannot be lowered without a material increase in its relative humidity. If the heat load in the enclosure and the rate of air circulation are both maintained constant, the evaporator temperature, and in consequence the temperature of the enclosure, will fall if the absorption solution is weakened when water alone is employed in the evaporator; but when a solution is employed in the evaporator, the evaporator and the room temperatures fall due to the enriched evaporator solution as well as due to the weakened absorber solution, while the dew point stays in approximately the same place.

Such a condition would make the use of a solution undesirable for it is more or less worthless as far as comfort in the enclosure is concerned to lower the temperature of the air if at the same time the relative humidity is materially increased.

Therefore as a part of this invention the float and float valve G are provided in the liquid line E from the condenser D to the reservoir F. This float valve closes off the supply of water from the condenser as the solution within the reservoir becomes richer in water content and as its level becomes consequently higher. The water from the condenser builds up in the U trap formed by the extension of the lead E and overflows to waste at X.

The provision of the float valve and the overflow X is all that is required to obtain a flexible dew point in the conditioned air, for by adjusting the float mechanism, any desired level (and therefore concentration) of solution in the reservoir is attained.

One form of construction by means of which a desired level of the solution in the reservoir is preserved includes an inlet fitting A' which communicates with a fitting B' connected to pipe E. A valve D' is adapted to cooperate with a seating surface E' formed upon the fitting A' and is mounted upon a stem which is normally urged away from the fitting A' by a spring C' to maintain the valve D' in a normally opened position. To serve as a seat for the spring C', the valve shaft is provided with a disc J'. The valve is closed by means of a float F'' which is mounted upon an arm G' pivoted at H' and formed with a head I' which is adapted to engage the end of the valve shaft. A sleeve K' is adjustably secured to shaft G' by means of set screw L' and the float F'' is secured to the sleeve K'.

Due to the infiltration and evaporation in the enclosure there is a tendency for the amount of water in the system to increase so that by readjusting the float a solution richer in water content may be obtained after a weaker solution has been employed, without affecting the strength of the absorber solution.

It is therefore seen that in the present invention the concentration of the solution in the evaporator may be maintained at a predetermined and optional value which is entirely independent of what may be done with the evaporator temperature.

In Figure 2 there is illustrated an embodiment of the invention operating in all respects as described with reference to Figure 1, with the exception that the steam driven off in the generator A is permitted to escape from the system and fresh water from the water mains is supplied to the reservoir F through the lead E instead of condensed water from a condenser.

In this embodiment the concentration of the solution in the reservoir is maintained at an optional value as before by regulating the supply of fresh water through the agency of the float and float valve G.

I claim as my invention:

1. In a system for refrigerating and conditioning air wherein the air is cooled by the evaporation of water and the diffusion of the evaporated water vapor into the air, a method of controlling the dew point of the air which consists in lowering the dew point of the air by absorption, evaporating the water from a solution of lower vapor pressure than the vapor pressure of water and higher vapor pressure than the pressure corresponding to the dew point of the delivered air, thus cooling the air passing over the solution, retaining the solute in the liquid state substantially in its entirety during the evaporation, and supplying the evaporator with refrigerant removed from the air in the process of absorption.

2. In a system for refrigerating and conditioning air wherein the air is cooled by the evaporation of water and the diffusion of the evaporated water vapor into the air, a method of controlling the dew point of the air which consists in lowering the dew point of the air by absorption, evaporating the water from a solution of lower vapor pressure than the vapor pressure of the water and higher vapor pressure than the pressure corresponding to the dew point of the delivered air, thus cooling the air passing over the solution, passing the cooled air to the enclosure to be air conditioned, excluding the vapor of the solute, through the agency of which the vapor pressure of the solution has been lowered, from the enclosure to be air conditioned, and supplying the evaporator with refrigerant removed from the air in the process of absorption.

3. In a system for refrigerating and conditioning air wherein the air is cooled by the evaporation of water and the diffusion of the evaporated water vapor into the air, a method of controlling the dew point of the air which consists in lowering the dew point of the air by absorption, evaporating the water from a solution of lower vapor pressure than the vapor pressure of the water and higher vapor pressure than the pressure corresponding to the dew point of the delivered air, cooling the air passing over the solution, passing the cooled air to the enclosure to be air conditioned, excluding the vapor of the solute, through the agency of which the vapor pressure of the solution has been lowered, from the enclosure to be air conditioned by retaining the solute in the liquid state substantially in its entirety during the evaporation, and supplying the evaporator with refrigerant removed from the air in the process of absorption.

4. In a system for refrigerating and conditioning air wherein the air is cooled by the evaporation of water and the diffusion of the evaporated water vapor into the air, a method of controlling the dew point of the air which consists in lowering the dew point of the air by absorption, evaporating the water from a solution of lower vapor pressure than the vapor pressure of the water and higher vapor pressure than the pressure corresponding to the dew point of the delivered air, thus cooling the air passing over the solution, maintaining the concentration of said solution at an optional value, passing the cooled air to the enclosure to be air conditioned, and supplying the evaporator with refrigerant removed from the air in the process of absorption.

5. In a system for refrigerating and conditioning air wherein the air is dried at a constant temperature by absorption and subsequently cooled by the evaporation of water and the diffusion of the evaporated water vapor into the air, a method of controlling the dew point of the air which consists in lowering the dew point of the air by absorption, evaporating the water from a solution of lower vapor pressure than the vapor pressure of the water and higher vapor pressure than the pressure corresponding to the dew point of the delivered air, maintaining the concentration of the solution in the evaporator at an optional value, changing the dew point of the air passing over the solution to a value dependent upon the concentration of the solution, thus cooling the air passing over the solution, passing the cooled air to the enclosure to be air conditioned, and supplying the evaporator with refrigerant removed from the air in the process of absorption.

6. In a system for refrigerating and conditioning air wherein the air is dried at a constant temperature by absorption and subsequently cooled by the evaporation of water and the diffusion of the evaporated water vapor into the air, a method of controlling the dew point of the air which consists in lowering the dew point of the air by absorption, evaporating the water from a solution of lower vapor pressure than the vapor pressure of the water and higher vapor pressure than the pressure corresponding to the dew point of the delivered air, maintaining the concentration of the solution in the evaporator at a constant value, changing the dew point of the air passing over the solution to a value dependent upon the concentration of the solution, thus cooling the air passing over the solution, passing the cooled air to the enclosure to be air conditioned, and supplying the evaporator with refrigerant removed from the air in the process of absorption.

7. A system for refrigerating and conditioning air wherein the air is dried at a constant temperature by absorption and subsequently cooled by the evaporation of water and the diffusion of the evaporated water vapor into the air, comprising means to lower the dew point of the air, means to evaporate the water from a solution of lower vapor pressure than the vapor pressure of the water and higher vapor pressure than the pressure corresponding to the dew point of the delivered air, means to retain the solute in the liquid state substantially in its entirety during the evaporation, and means to supply the evaporator with refrigerant removed from the air in said means to lower the dew point of the air.

8. In a system for refrigerating and conditioning air wherein the air is dried at a constant temperature by absorption and subsequently cooled by the evaporation of water and the diffusion of the evaporated water vapor into the air, a method of controlling the dew point of the air which consists in evaporating the water from a solution of lower vapor pressure than the vapor pressure of water, maintaining a predetermined and optional concentration of the solution in the evaporator, maintaining a predetermined and optional dew point of the air admitted to the evaporator, and passing the air thus cooled and regulated as to both dew point and temperature to the enclosure to be air conditioned.

DONALD B. KNIGHT.